April 16, 1968   J. K. DAVIDSON ET AL   3,378,457
CERMET AND CERAMIC FUEL ELEMENT
Filed Aug. 18, 1965   2 Sheets-Sheet 2

Inventors
John K. Davidson
Richard S. Miller
By Forest C. Sexton
Attorney

United States Patent Office 3,378,457
Patented Apr. 16, 1968

3,378,457
CERMET AND CERAMIC FUEL ELEMENT
John K. Davidson, Rome, Italy, and Richard S. Miller, Brookfield, Wis., assignors to Allis-Chalmers Manufacturing Company, Milwaukee, Wis.
Continuation-in-part of application Ser. No. 391,396, Aug. 24, 1964. This application Aug. 18, 1965, Ser. No. 480,637
3 Claims. (Cl. 176—77)

This application is a continuation in part of application Ser. No. 391,396, filed Aug. 24, 1964, now abandoned.

This invention relates generally to nuclear reactors. More specifically this invention relates to a new and improved fueling arrangement for fast neutron reactors having a balanced combination of ceramic and cermet fuels to produce an inherent safety characteristic.

The only naturally occurring fissile material is the isotope uranium-235, and its abundance in nature is severely limited, being substantially less than 1% of the total natural uranium supply. However, it is well known that the comparatively abundant nonfissile materials uranium-238 and thorium-232 can be converted to the fissile isotopes plutonium-239 and uranium-233 respectively by subjecting them to neutron irradiation and particularly fast neutron irradiation. Therefore, in order to perpetuate nuclear fission as a lasting power source, and to realize its full potential, a great deal of attention has been directed toward fast reactors or breeder reactors. In such reactors, the abundant nonfissile materials uranium-238 and thorium-232 can be converted to fissile materials while at the same time producing useful power. The fast reactor is especially well suited as a breeder because its high neutron economy can effect a breeding ratio in excess of unity. That is to say, it can produce more fissile material than it consumes.

A fast reactor is classified as "fast" because it has been designed to operate with neutrons at a high energy causing fission. That is, it does not incorporate a moderator to slow neutrons to thermal or intermediate energies. Rather, moderation is kept at a minimum so that high energy neutrons, at about 0.2 mev., prevail to cause fission of the fuel. If breeding is desired, fertile material must be present in close proximity to the core and high energy neutrons should prevail to more readily convert the fertile material.

Although fast reactors, as breeders, seem most promising in realizing the full potential of nuclear power, they are plagued with several disadvantages insofar as safety and costs are concerned. For example the absence of a moderator in fast reactors results in a reactor that is harder to control. Without a moderator, the fast neutrons have a shorter lifetime, which under certain circumstances, could lead to a rather large accidental power excursion. Furthermore, fast reactors usually contain enough fuel to make several critical masses if arranged more compactly. Therefore, it is critically important in fast reactors that the position and structural integrity of the fuel be maintained. If the fuel should become more compact during operation, positive increases in reactivity would result causing dangerous or damaging power excursions.

Although oxides or other bulk ceramic fuels are usually more desirable as a nuclear fuel because they are cheaper, permit higher operating temperatures, and are less susceptible to radiation damage, they have not been used in fast reactors in the past because of their low thermal conductivity, questionable structural integrity due to brittleness and nonreproducible expansion properties. The brittleness of the ceramic fuels could result in fractures within the fuel element casements and cause densification through axial redistribution or slumping. As explained above, this would in turn cause positive increases in reactivity and hazardous power excursions. Therefore, with safety considerations controlling, fast reactors in the past have always utilized the more expensive metallic or alloy fuels to take advantage of their nonbrittleness and high thermal conductivity. These metallic and alloy fuels however, do have disadvantages in that they are more expensive to produce and have a more limited useful life due to irradiation damage, namely, decreased ductility and rather severe growth and swelling. The growth and swelling of course results in reduced densification and negative changes in reactivity.

This invention is predicated upon our conception of a fast reactor core structure wherein oxide or other bulk ceramic fuels may be safely employed to provide inherent safety characteristics, particularly during reactor power transients, by utilizing a balanced combination of ceramic and cermet fuels to achieve a reproducible negative reactivity effect.

Accordingly, it is a primary object of this invention to permit the use of oxide and other bulk ceramic fuel materials in fast reactors.

It is another primary object of this invention to provide a fast neutron reactor, and fuel assemblies therefore, having a balanced combination of ceramic and cermet fuels to assure negative net reactivity effects during power transients by balancing the increased densification of the ceramic fuel and decreased densification of the cermet fuel.

It is another primary object of this invention to provide a fast neutron reactor and fuel assemblies therefore, utilizing a substantial amount of ceramic fuels to realize their economic advantages, and also utilizing a sufficient amount of cermet fuels to assure a net negative reactivity characteristic.

It is still another primary object of this invention to provide a fast neutron reactor partially utilizing simple oxide or other bulk ceramic fuels.

These and other objects and advantages are fulfilled by this invention as will become apparent from a full understanding of the following detailed description, especially when considered in conjunction with the accompanying drawings in which.

Figure 1:
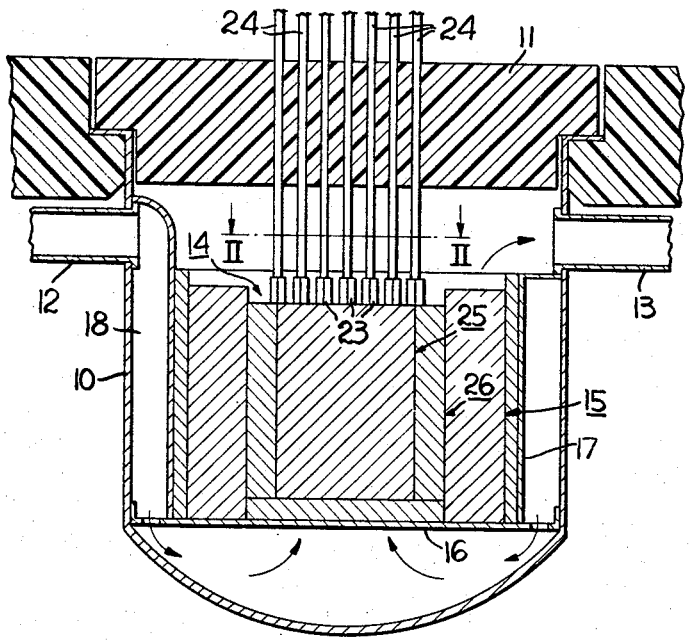
FIG. 1 is a sectional side elevation of a nuclear reactor showing the two region core of this invention.
Figure 2:
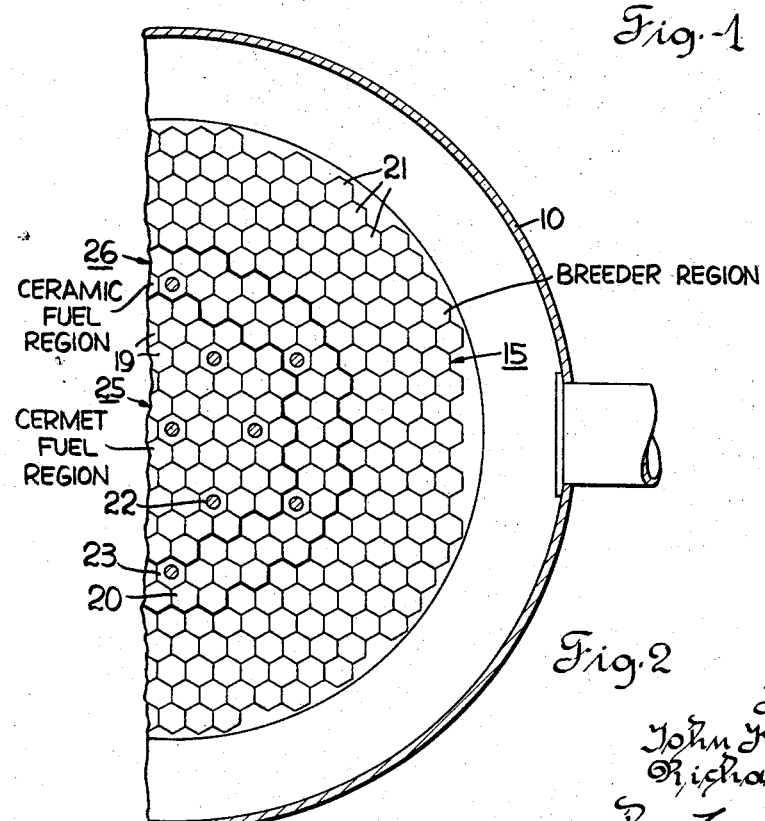
FIG. 2 is a partial section, top view of the reactor shown in FIG. 1 taken at line II—II of FIG. 1, the boundary between the three primary regions has been made darker.

Referring now to the drawings and particularly to FIGS. 1 and 2, a fast neutron reactor incorporating one preferred embodiment of this invention comprises a reactor pressure vessel 10 having a removable cover plug 11 and provided with suitable external connections for at least one coolant inlet 12 and at least one coolant outlet 13.

Within the reactor pressure vessel 10, the core or fissionable region 14, and surrounding blanket region 15, are supported by a suitable grid plate 16 and a cylindrical, lateral support wall 17. The lateral support wall 17 also serves as a baffle separating the inlet coolant from the outlet coolant by forming a coolant inlet chamber 18 which surrounds the core 14 and blanket 15.

A blanket region such as blanket 15 is commonly incorporated into fast reactors for the double purpose of providing a protective shielding from escaping fast neutrons from the core, and it serves to utilize the escaping fast neutrons to convert fertile materials contained therein into fissionable fuels. With such a blanket region containing fertile materials the reactor is utilized as a breeder reactor. It should be appreciated that "fissionable fuels" and "fertile materials" are relative terms and that any one of these materials may to a limited extent, contain some of the other material. However, the core will contain substantially more fissionable fuels than the blanket, although both regions will usually contain more fertile material than fissionable fuels.

As in most reactors, the core 14 and blanket 15 are formed by a plurality of vertically disposed, elongated assemblies, being fuel assemblies 19 and 20 in the core region and blanket assemblies 21 in the blanket region. As shown in FIG. 2, assemblies having hexagonal cross section are usually preferred because a cylindrical geometry in the core and blanket can more closely be approximated. However, the cross-sectional shape of the assemblies is not critical so that other shapes could be used without departing from the spirit of this invention.

Suitable control rods 22 within control rod guide sleeves 23 must of course be provided to control the reactivity of the core 14. Safety rods (not shown) may also be provided. The position of the control rods 22 is regulated by an external control rod drive mechanism (not shown) acting through the control rod drive arms 24. The control rods 22 and associated mechanisms are not shown in great detail as they are, or may be, quite conventional in nature.

The crux of the invention resides in the core 14 which is divided into two primary regions, namely the central region 25 fueled with cermet fuels, and the peripheral region 26 fueled with ceramic fuels. Accordingly, the fuel assemblies 19 will contain the cermet fuel, while the fuel assemblies 20 will contain the ceramic fuels.

Figures 5, 6:
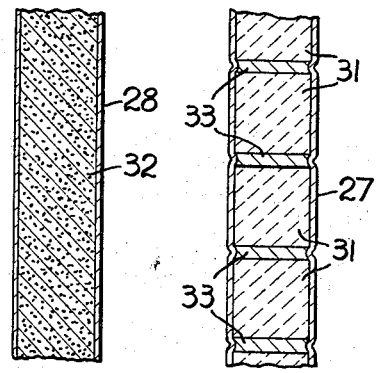
FIG. 5 is a cross-sectional, partial elevation of a cermet fuel pin shown in FIG. 3.
FIG. 6 is a cross-sectional partial elevation of a ceramic fuel pin shown in FIG. 3.

Because of the questionable structural integrity of the ceramic fuel, the fuel assemblies 20 must be carefully designed to avoid gross axial redistribution of the fuel. This can be accomplished by segmenting or compartmentalizing the ceramic fuels into vertically disposed fuel tubes as shown in FIG. 6. Such segmenting is generally well known in the art and need not be detailed here. It should be noted however, that the individual segments should be left small to minimize the effects of any densification. On the other hand, it may be preferable to use horizontal cross-flow fuel assemblies as disclosed in our copending patent application Ser. No. 391,396, filed Aug. 24, 1964. By using either of these fueling arrangements, any shrinkage or densification of the ceramic fuel will merely be local in nature, thus preventing gross axial redistribution.

The ceramic fuel itself may be any enriched ceramic fuel, the most common of which are uranium dioxide or plutonium dioxide. However, any other suitable ceramic fuel would be satisfactory such as other oxides, carbides, nitrides, phosphides, sulfides or mixtures thereof. For the purposes of this invention, enrichments are not critical and may vary substantially depending upon the specific design and the desired characteristics of the reactor.

Insofar as the cermet fuel assemblies 19 are concerned, their characteristics in reactors are well known and need not be greatly discussed here. The cermet fuel is basically enriched particles of ceramic fuel in a matrix of any suitable corrosion resistant refractory metal such as stainless steel, tungsten, zirconium and the like. As a practical limitation, the quantity of ceramic particles may usually be anywhere from about 20 to about 80% of the total volume. Thus, this fuel is resistant to radiation damage and has high temperature strength, with the properties of the metal matrix contributing to good heat conductivity, reproducible thermal expansivity and high ductility.

In critical operation, the fissile materials in both the central core region 25 (fuel assemblies 19) and the peripheral core region 26 (fuel assemblies 20) are relied upon to maintain the chain reaction. As the rate of power generation in both regions increases, the cermet fuel segments, in the central region of the core 25, will increase slightly in length due to the rise in temperature. The ceramic fuel, in the peripheral region of the core 26, will most probably undergo some densification. This densification will be local in nature because of the segmentation of the fuel. Densification of the ceramic fuel will cause a local increase in reactivity in the core. However, the increase in length (decrease in density) of the cermet fuel will cause a local decrease in reactivity, and will counteract the increase in reactivity caused by the ceramic fuel. Thus, the thermal mechanical response of the cermet fuel serves to provide a net negative reactivity response despite the presence of the ceramic fuel. This core arrangement accordingly permits the utilization of ceramic fuels of high burnup potential without the possible positive reactivity effect associated with a complete bulk ceramic core.

It is, of course, paramount that a sufficient quantity of cermet fuel be provided to create a negative component of reactivity equal to or greater than any positive reactivity contributions due to the densification of the ceramic fuel. For most practical applications therefore, the relative amounts of each fuel should be anywhere from a 50-50 ratio to a 70-30 ratio, the ratio being that of ceramic fuel to cermet fuel, respectively. The actual ratio used will of course depend upon the reactor size and characteristics desired and the individual characteristics of the two fuels, such as the expansion or slumping cofficients of the fuels and their reactivity worth and their radial fuel worths.

To exemplify such determinations here, certain assumptions would have to be made. Therefore, assuming that the cermet fuel has a coefficient of expansion equal to $8 \times 10^{-6}$ in./° F. and assuming that the ceramic fuel is segmented into 3 inch lengths and slumps ⅛ inch per segment, and further assuming that the reactivity worths of the two fuels are equal and that the radial fuel worth variation can be approximated by the radial power distribution, then equal proportions (50–50) of each fuel would be necessary for equal positive and negative reactivity components for a postulated cermet temperature rise of 500° F. On the other hand, for a postulated cermet temperature rise is 1000° F., a ratio of ceramic to cermet of 2:1 would be necessary to provide equal reactivity components.

It is apparent that it would be possible to reverse the relative positions of the two fuel types. That is, similar effects could be achieved by placing the ceramic fuel in the central region of the core and the cermet fuel in the peripheral region. If this were done, however, some advantage would be lost in that much smaller proportions of ceramic fuel would have to be used to provide a net negative reactivity response. This would result because the fuel in the central region of the core has a greater worth, due to its relative position, than fuels in the peripheral region. Thus reactivity is greater in the central region than in the peripheral region and therefore the effects of positive or negative reactivity changes are greater in the central region. For example, under the same assumptions as above, if the relative position of the fuels are reversed, about 1:4 ratio of ceramic fuel to cermet fuel would be required for equal reactivity components as a postulated cermet temperature rise of 500° F. Since one of the most desirable features of this invention is the ability to use the ceramic fuel which provides an economic advantage, then of course it would be desirable to locate the ceramic fuel in the peripheral region so that a higher proportion of the ceramic fuel can be used to capitalize on this advantage.

In FIGS. 3, 4, 5 and 6 another embodiment of this invention is shown. In this embodiment the core is not divided into two primary regions. Rather, each individual fuel assembly is divided into two regions to effect similar results as explained above.

Figure 3:
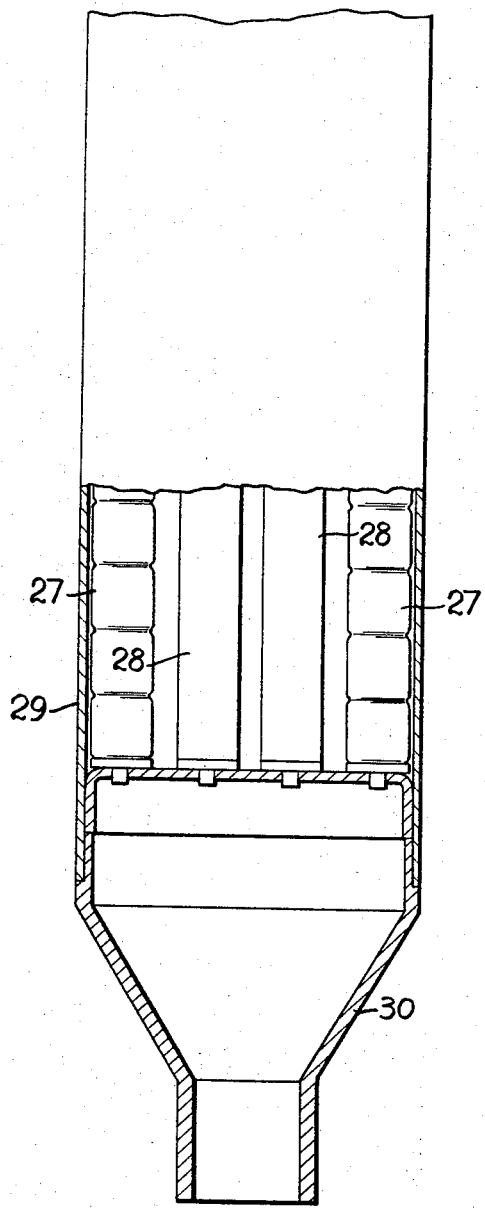
FIG. 3 is a partial view taken at line III—III of FIG. 4 showing a section of a fuel assembly encompassing another embodiment of this invention.
Figure 4:
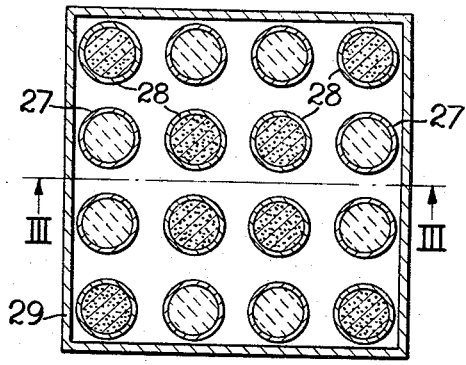
FIG. 4 is a cross-sectional view of the fuel assembly shown in FIG. 3.

Referring specifically to FIGS. 3 and 4, the fuel assembly incorporating this embodiment of the invention comprises a plurality of vertically disposed fuel tubes 27 and 28 enclosed in a metallic casement 29. A coolant nozzle 30 is provided at the lower end of the casement 29 so that coolant can be passed vertically upward within the casement. Since fuel assemblies having vertically disposed fuel tubes are well known in the art, the structure thereof need not be further detailed here. For purposes of simplicity, the fuel assembly is shown to have a square cross section, and of course, other cross-sectional forms could be used if desired.

The novel feature of this fuel element resides in the fact that the vertical fuel tubes are not identical. That is, fuel tubes 27, as shown in more detail in FIG. 6 are fueled with cermet fuel pellets 31, while fuel tubes 28, as shown in more detail of FIG. 5 are fueled with ceramic fuel 32.

Because of the potential densification of the ceramic fuel 31, it is again necessary to segment the fuel into small segments so that any axial redistribution will be local in nature. This can be readily accomplished by securing spacer disks 33 to the fuel tube as shown. The cermet fuel 32, on the other hand, is physically more stable and will expand rather than slump, and accordingly must be so loaded into the fuel tube 28 to allow for such expansion.

In critical operation, both fuels are relied upon to maintain the chain reaction. Here again, as the rate of power generation increases, the ceramic fuel may slump resulting in a local positive reactivity response while the cermet fuel expands resulting in a local negative reactivity response. Accordingly, if the proper ratios of fuel are present, a slight net negative reactivity response can be effected despite the presence of the ceramic fuel.

Here again it is paramount that a sufficient quantity of cermet fuel be provided to create a negative component of reactivity equal to or greater than the positive reactivity contributions effected by the ceramic fuel. In this embodiment however, the relative proportions of the two respective fuels will not be the same as in the two region core embodiment. This is because in this embodiment the fuels are uniformly distributed within the core and their respective net worths would not be affected by radial position. That is, the proportion of the two fuels will be the same in the central high worth region as in the peripheral region wherein the fuel worth is less. Therefore, assuming the same expansion and slumping coefficients as above and that the relative worths of the fuels are equal, a ratio of ceramic fuel to cermet fuel would have to be about 1:2, in order to provide equal positive and negative reactivity insertions over an increase of reactor core temperature of 500° F. For a reactor core temperature rise of 1000° F., equal proportions (1:1) would be necessary.

Figure 7:
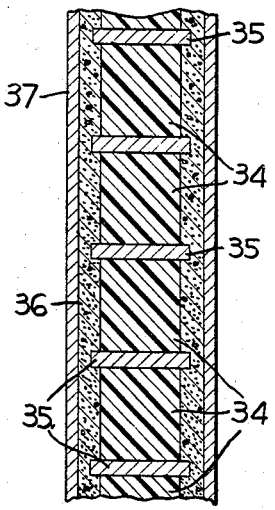
FIG. 7 is a partial longitudinal section of a fuel tube illustrating a third embodiment of this invention.

Another embodiment of this invention is incorporated into the fuel tube shown in FIG. 7 which comprises a plurality of oxide or other bulk ceramic fuel pellets 34, axially disposed in the center of the fuel tube. Spacing disks 35 of some suitable refractory material such as stainless steel, tungsten, zirconium and the like are axially positioned between the ceramic fuel pellets 34. A tubular shaped cermet fuel member 36 surrounds and engages the ceramic fuel pellets 34 and disks 35 in such a manner that disks 35 are particularly engaged securely to prevent any axial relocation of the disks. For example, the disks 35 may be secured to the cermet fuel member 36 by welding (not shown) or by actually embedding the circumferential portion of the disks into the annulus walls of the tubular cermet fuel member as shown in the drawing. This can easily be effected by drawing or swaging the cermet fuel tube 36 down over the disks 35. If preferred, the annular shaped fuel tube 36 can be fabricated in segments and held in position by the tubular casement. Thus, in effect, the annulus defined by the tubular shaped cermet fuel member 36 is segmented into a plurality of compartments by the disks 35. The ceramic fuel pellets 34 within the compartments then rest upon the disks. If the ceramic fuel pellets 34 should shrink as a result of densification, the disk 35 tightly secured to the cermet fuel member 36, will prevent gross axial redistribution.

A sheathing or encasement 37 should surround and engage the outer surface of the cermet fuel member 36. The engagement should be tight in order to realize good heat transfer characteristics. The sheath should be made of any suitable corrosion resistant material as stainless steel, niobium, tungsten, zirconium and the like. End plugs (not shown) should be secured to the sheath to provide a leakproof enclosure. Since such end plugs vary considerably in the art depending upon specific mechanical applications and are generally well known, no details of such end plugs need be given here.

In critical operation, the fissile materials in both the ceramic pellets 34 and the cermet tube 36 will maintain the chain reaction. As the rate of power generation in both the ceramic and cermet regions increases, the cermet tube 36 increases in length due to the rise in temperature. The ceramic pellets 34 will probably undergo local densification. If the ceramic pellets 34 do undergo local densification a local increase in reactivity will result. However, the increasing length of the cermet tube 36 will act to increase the distance between the ceramic pellets 34 and thus counteract any increase in local reactivity. Thus, the thermal-mechanical response of the cermet, fuel serves to achieve a total negative reactivity response to increases in reactor power. Even if the ceramic fuel undergoes gross redistribution, the segmenting disks will maintain their relative axial distribution.

As the fuel tube gets hotter under continued operation, the heat must be given off to the surrounding heat exchange media. Since the heat is extracted from the surface of the casement or sheath 37, a temperature gradient is created across the radius of the fuel element with the hottest portion of the fuel element being at the axis thereof. In this axis region then, resistance to high temperatures and resistance to radiation damage are most important. Accordingly, in the axis region, the ceramic fuel is positioned which does possess superior resistance to high temperatures and is less susceptible to irradiation damage. On the other hand, the portion of the fuel tube which is more adjacent to the sheath or casement 37, is not as hot and therefore resistance to irradiation and refractory properties are not so vital. In this area, good thermal conductivity is more important so that the internal heat of the fuel tube can be transferred to the heat exchange media to reduce the overall temperature gradient. In this region adjacent to the sheath or casement then the cermet fuel is utilized which, in addition to providing support to the total fuel tube structure, possesses good thermal conductivity to transfer the heat from the interior of the fuel element.

It is understood that this invention is not to be limited to the details and examples given herein, but that it may be modified within the scope of the appended claims.

The embodiments of the invention in which an exclusive property or privilege is claimed are defined as follows:

1. A fuel element for a fast neutron reactor comprising in combination a tubular shaped cermet fuel member defining a cylindrical chamber; a metallic sheath surrounding and engaging the outer surface of said tubular shaped cermet member; a plurality of metallic disks spaced within said cylindrical chamber rigidly secured to the inside surface of said tubular shaped cermet member dividing said cylindrical chamber into a plurality of smaller chambers; and a ceramic fuel pellet disposed within each of said smaller chambers, the outer periphery thereof in contact with the inner surface of the tubular cermet member.

2. The fuel element as described in claim 1 wherein the quantity of said cermet fuel in relation to said ceramic fuel is sufficient to cause a net negative reactivity response upon increases in reactor power.

3. The fuel element as described in claim 2 wherein said ceramic fuel comprises from 50 to 70 percent of the total fuel content.

References Cited

UNITED STATES PATENTS

| | | | |
|---|---|---|---|
| 3,053,743 | 9/1962 | Cain | 176—76 X |
| 3,197,381 | 7/1965 | Blake | 176—78 X |
| 3,211,626 | 10/1965 | Nerenstone et al. | 176—89 X |
| 3,230,152 | 1/1966 | Kerze | 176—76 |
| 3,244,599 | 4/1966 | Hildebrand | 176—89 X |

FOREIGN PATENTS

| | | |
|---|---|---|
| 220,183 | 5/1958 | Australia. |
| 896,343 | 5/1962 | Great Britain. |

REUBEN EPSTEIN, *Primary Examiner.*